United States Patent Office 3,547,883
Patented Dec. 15, 1970

3,547,883
PROCESS FOR THE PRODUCTION OF POLYESTERETHERS
Hidehiko Kobayashi, Kiichiro Sasaguri, and Noboru Tanimura, Tokyo, Japan, assignors to Asahi Kasei Kogyo Kabushiki Kaisha, Osaka, Japan, a Japanese corporation
No Drawing. Filed Dec. 8, 1967, Ser. No. 688,986
Claims priority, application Japan, Dec. 16, 1966, 41/82,120
Int. Cl. C08g 17/04, 17/10
U.S. Cl. 260—47                              4 Claims

ABSTRACT OF THE DISCLOSURE

Process for the production of linear polyesterethers containing at least 90 mole percent of a unit of the formula;

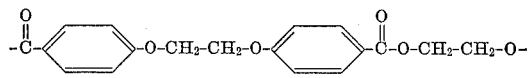

based upon the recurring unit in the molecular chain, comprising adding ethyleneglycol to 1,2-bis(p-carboxyphenoxy)ethane in such amounts as to provide a mole ratio of ethyleneglycol to 1,2-bis(p-carboxyphenoxy)ethane of 1.2 to 5.0, reacting the resulting mixture at a temperature of from 190 to 280° C. under a pressure of from 1 to 80 kg./cm.$^2$ to approximate a mole ratio of —COOCH$_2$CH$_2$OH to —COOH to a value of from 1.0 to 5.0, preferably to 1 from above 1 as much as possible, if necessary, further reacting the reaction product at a temperature of from 250 to 300° C. under a pressure of 0.1 mm. Hg to 80 kg./cm.$^2$ and subsequently subjecting the resulting reaction product to a polycondensation at elevated temperatures under reduced pressure in the absence of any polycondensation catalyst.

---

This invention relates to a process for producing linear polyesterethers containing at least 90 mole percent of a unit of the formula;

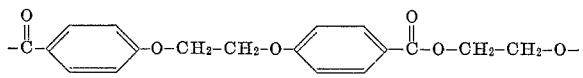

based on the recurring unit in the molecular chain.

These polyesterethers have already been produced by a polycondensation reaction at high temperatures under a high vacuum in the presence of a polycondensation catalyst, of the ester exchange reaction product of a lower alkyl ester of 1,2-bis(p-carboxyphenoxy)ethane with ethyleneglycol or of the direct esterification reaction product of 1,2-bis(p-carboxyphenoxy)ethane with ethyleneglycol.

Metal salts or metal oxides have been employed as catalyst in these processes and they promote, in addition to polycondensation the random scission of the ester-linkages in the polymer chain and introduce discoloration into the final polymer products. Furthermore these metal catalysts present promote a thermal and oxidative degradation in the course of melt spinning the polymer products. Consequently it is usually required to add a stabilizer to block these metal compounds in the polycondensation process. These stabilizers include phosphorous compounds. The addition of such stabilizers reduces the activity of polycondensation catalysts and limits the kind of catalysts which may be used.

The presence of these metal compounds in the melt shaped articles may be colored by for example, the grey characteristic of the metal ions and this discoloration renders the products unsuitable for use in the fabric or textile field since it cannot be removed by a bleaching or scoring process. When producing films, the remaining inorganic compounds reduce the transparency to light of the film. Thus the polymeric products prepared in the presence of a polycondensation catalyst have an inferior market standing and suffer from an economic competitive disadvantage.

It can be easily seen that the polycondensation reaction process for producing above-described polyesterethers by various methods consists substantially of a deethyleneglycolization reaction and an ester exchange reaction and would proceed in the absence of a polycondensation catalyst if all the free ethyleneglycol could be removed from the reaction system since the equilibrium constants of the reactions are relatively small. However, a long polycondensation time is required for producing a fiber-forming, high molecular weight polymer without the use of the catalyst. According to U.S. Pat. No. 2,739,957 and other literature, the addition of a polycondensation catalyst is an indispensable condition for producing fiber-forming linear polyesterethers in a reasonable period.

One object of this invention is to provide a novel process for the production of polyesterethers without utilizing any polycondensation catalyst.

Other objects of this invention will become apparent from a consideration of this entire specification including the claims hereof.

In accord with and fulfilling these objects, there is provided a process for producing linear polyesterethers containing at least 90 mole percent of the unit of the formula;

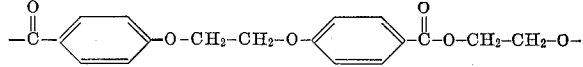

based on the recurring unit in the molecular chain, which comprises adding ethyleneglycol to 1,2-bis(p-carboxyphenoxy)ethane (hereinafter abbreviated as "BCE") in such amounts as to provide a mole ratio of ethyleneglycol to 1,2-bis(p-carboxyphenoxy)ethane of about 1.2 to 5.0, reacting the obtained mixture at a temperature of from 190 to 280° C. under a pressure of from 1 to 80 kg./cm.$^2$ to approximate a mole ratio of —COOCH$_2$—CH$_2$OH to —COOH to a value of from about 1.0 to 5.0, preferably to 1 from above 1 as much as possible, and subsequently subjecting the obtained reaction product to a polycondensation at elevated temperatures under reduced pressures in the absence of any polycondensation catalyst.

When carrying out the process of this invention, ethyleneglycol is added to BCE in such amounts as to provide a mole ratio of ethyleneglycol to BCE of about 1.2 to 5.0, and the obtained mixture is reacted at a temperature of from 190 to 280° C. under a pressure of 1 to 80 kg./cm.$^2$, preferably 2 to 50 kg./cm.$^2$ to approximate a mole ratio of —COOCH$_2$CH$_2$OH to —COOH to a value of from about 1.0 to 5.0, preferably to 1 from above 1 as much as possible. The reaction time depends upon the amount of ethyleneglycol used, the reaction temperature and the pressure. The reaction is completed in about 10 hours, usually in about 3 to 5 hours. It is preferred to positively remove the water produced, but this process entails many difficulties and can be dispersed with. After this esterification is completed, the unreacted ethyleneglycol in the reaction system is distilled off at a temperature above 200° C.

The primary object of the esterification reaction is to approximate the mole ratio of —COOCH$_2$CH$_2$OH to —COOH to a value of from about 1.0 to 5.0, preferably to as near to 1 from above 1 as possible and to give a substantially homogeneous reaction system to such an extent as not to hinder the subsequent polycondensation.

If necessary, the esterification reaction product may be further reacted at a temperature of from 250 to 300° C. under a pressure of from 0.1 mm. Hg to 80 kg./cm.², preferably from 1 mm. Hg to 20 kg./cm.².

In this invention also at least one of the aliphatic dicarboxylic acid of the formula;

$$HOOC-(CH_2)_n-COOH$$

(wherein $n$ is an integer of 1 to 8) may be employed together with BCE up to 10 mole percent so long as the conditions required for the concentration of $$-COOCH_2CH_2OH$$

and —COOH groups in the system is filled. The group —$(CH_2)_n$— in the above formula may have a branched hydrocarbon chain with at most 3 carbon atoms. Exemplary aliphatic acids include malonic acid, succinic acid, glutaric acid, adipic acid, pimeric acid, suberic acid, azelaic acid, sebacic acid, methylsuccinic acid, α-methylglutaric acid and β-methylglutaric acid.

In the subsequent polycondensation reaction process, the reaction product obtained in the esterification reaction is heated at a temperature of 250 to 300° C., preferably 270 to 295° C., under a reduced pressure of below 5 mm. Hg, preferably 1 mm. Hg and the water and ethyleneglycol produced are distilled off from the reaction system until a reduced viscosity of the resulting polymers attained is above 0.6. As the mole ratio of $$-COOCH_2CH_2OH$$

to —COOH is a value of from about 1.0 to 5.0, and preerably reduced from above 1 to as near to 1 as possible the polycondensation reaction according to this invention is essentially a deethyleneglycolization condensation and dehydration and it is most advantageous to maintain the dehydration condensation prevailing over the other in the polycondensation. When the heating time is plotted against the rise in viscosity, the plots of the viscosities fall on a S-shaped curve, that is, they rise gradually in the beginning of polycondensation, then rise rapidly and gradually in the latter period of polycondensation. The period betwen the gradual viscosity rise in the beginning and the subsequent rapid viscosity rise is shortened as the mole ratio of —$COOCH_2CH_2OH$ to —COOH is increased from above 1 to 1. When the mole ratio is below 1, it is difficult to obtain a desired viscosity rise owing to —COOH prevailing over —$COOCH_2CH_2OH$. As shown by the examples, the polycondensation time required is less than 10 hours.

The present invention may also be employed for producing the copolymers of polyethylenediphenoxyethane-4,4'-dicarboxylate. A small amount of at least one comonomer such as other glycols, dicarboxylic acids, esters thereof, hydroxycarboxylic acids or esters thereof may be added in the course of the reaction. Thus, the polyesterethers substantially comprising polyethylenediphenoxyethane-4,4'-dicarboxylate may contain up to 10 mole percent glycol such as diethyleneglycol, tetramethyleneglycol and hexamethyleneglycol or up to 10 mole percent dicarboxylic acid such as hexahydroterephthalic acid, isophthalic acid, dimethylterephthalic acid, naphthalic acid, diphenic acid, adipic acid, sebacic acid, azelaic acid and esters thereof.

It has been found valuable to introduce into the condensation process prior to the polycondensation, as molecular weight modifier, at least one of the compounds having the following formulae;

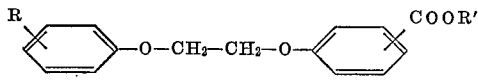
and
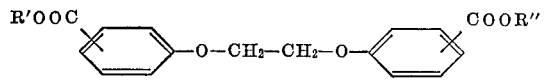

(wherein R is hydrogen atom, alkyl or alkoxy group; R' is hydrogen atom or —$CH_2$—$CH_2$—OH group; and R" is alkyl group).

Exemplary molecular weight modifiers include
1,2-bis(p-carboxyphenoxy)ethane monoethyleneglycol ester;
1,2-bis(p-carboxyphenoxy)ethane monomethyl ester,
1,2-bis(p-carboxyphenoxy)ethane monoethyl ester,
1,2-bis(p-carboxyphenoxy)ethane mono-nor-propyl ester,
1,2-bis(p-carboxyphenoxy)ethane mono-iso-propyl ester and monoethyleneglycol esters thereof;
p-carboxy-1,2-diphenoxyethane,
p-carboxy-O'-methyl-1,2-diphenoxyethane,
p-carboxy-m'-methyl-1,2-diphenoxyethane,
p-carboxy-p'-methyl-1,2-diphenoxyethane,
p-carboxy-p'-ethyl-1,2-diphenoxyethane,
p-carboxy-p'-nor-propyl-1,2-diphenoxyethane,
p-carboxy-p'-iso-propyl-1,2-diphenoxyethane,
p-carboxy-p'-methoxy-1,2-diphenoxyethane,
p-carboxy-p-ethoxy-1,2-diphenoxyethane,
monoethyleneglycol esters thereof.

It is preferred to employ about 0.1 to 10 mole percent molecular weight modifier based on the BCE.

By utilizing these molecular weight modifiers it has been found that the spinnability, transparency, lust and other properties of the polymer products may be remarkedly improved. Regarding the spinnability, the draftability in extruding the polymer products from a spinning nozzle and the subsequent heat stretching are improved and the yarns obtained show an excellent transparency and lust with increase in tensile strength and elongation as well as knot strength and elongation.

In general when producing a polymer the most difficult problem is to control the molecular weight of the polymer, which may vary widely depending upon the polymerization conditions. The above-described compounds have solved this problem and depending upon the amount of the compounds used the molecular weights of the polymers of this invention can be controlled.

The polymers produced according to this invention have an excellent thermal stability and whiteness even compared with those containing at most 0.03% by weight of antimony trioxide as catalyst which are produced by the prior art processes with maximum care so as to reduce the usual grey color as much as possible. However, stabilizers may also be employed in this invention. Owing to the absense of a polycondensation catalyst to be blocked with a stabilizer in this process, these stabilizers sufficiently stabilize the product when used in small amounts. These are exemplified by known phosphorous compounds including, for example, phosphoric acid, phosphorous acid, hypophosphorous acid and alkali or alkali earth metal salts thereof, ammonium salts thereof and alkyl or aryl ester thereof such as triphenylphosphite and tricresylphosphite. These stabilizers must be added to the reaction after the completion of the esterification reaction. When they are present in the esterification reaction, the polycondensation rate is not fully accelerated, but when they are added after the completion of the esterification reaction a sufficient stabilizing effect is produced without lowering the polycondensation rate.

The transparency, the brightness of a color tone after dyeing and the spinnability of the polymers produced by the invention are remarkably improved compared with those in the prior art.

This invention will be illustrated by the following examples which are in no way limiting upon the scope hereof. Parts and percentages are by weight and viscosities are reduced viscosities measured at 35° C. at a concentration of 0.2 g. per 100 cc. in a 1:2 by weight mixture of phenol and tetrachloroethane unless expressly stated to the contrary.

EXAMPLE 1

In an autoclave there were placed 302 parts of BCE, 16.35 parts of p-carboxy-p'-methyl-1,2-diphenoxyethane, as molecular weight modifier, and 310 parts of ethyleneglycol and the esterification reaction was held at 240° C. for 2 hours in the closed system. On admission of air, the produced water and the ethyleneglycol in the system were distilled off. The mole ratio of

—COOCH$_2$CH$_2$OH to —COOH in the resulting reaction mixture was found to be 1.05. To the obtained reaction product there was added 2.0% of titanium dioxide dispersed in ethyleneglycol as delustering agent and the polycondensation was carried out at 285° C. under a reduced pressure of 0.2 mm. Hg. The reduced viscosities of the resulting polymer were measured with an elapse of time. The results are shown in Table I in comparison with those in the absence of the molecular weight modifier.

TABLE I

| Polymerization time, minutes: | Reduced viscosity molecular weight modifier, mole percent | |
|---|---|---|
| | 0 | 3 |
| 90 | 0.298 | |
| 120 | 0.561 | 0.234 |
| 150 | 0.835 | 0.556 |
| 180 | 1.043 | 0.620 |
| 240 | (¹) | 0.659 |
| 300 | (¹) | 0.718 |
| 360 | (¹) | 0.728 |

¹ Gelled.

In the following Table II there is given the reaction time required for obtaining a polymer product having a reduced viscosity of 0.6 in the polycondensation in case of varying the mole ratio of —COOCH$_2$CH$_2$OH to

—COOH in the esterification with a change of the esterification time under the above reaction conditions.

TABLE II

| Esterification time, minutes: | Mole ratio of —COOCH$_2$CH$_2$OH to —COOH | Required polycondensation time, minute |
|---|---|---|
| 100 | 0.69 | >600 |
| 120 | 1.03 | 170 |
| 150 | 2.02 | 200 |
| 180 | 3.67 | 270 |
| 240 | 6.99 | 480 |

Further, in the following Table III, there is given the polycondensation time required for obtaining a polymer product having a reduced viscosity of 0.6 in the polycondensation in case of varying the mole ratio of

—COOCH$_2$CH$_2$OH to —COOH in the esterification with a change of the esterification temperature under the afore-mentioned reaction conditions.

TABLE III

| Esterification temperature, ° C.: | Mole ratio of —COOCH$_2$CH$_2$OH to —COOH | Required polycondensation time, minutes |
|---|---|---|
| 225 | 0.69 | >600 |
| 240 | 1.03 | 170 |
| 260 | 2.25 | 210 |

EXAMPLE 2

In an autoclave there were placed 302 parts of BCE and 180 parts of ethyleneglycol and the esterification was held at 240° C. for 5 hours under a pressure of 4 kg./cm.² of nitrogen with the produced water being distilled off. On admission of air, the unreacted ethyleneglycol was distilled off. The mole ratio of

—COOCH$_2$CH$_2$OH to —COOH in the resulting reaction mixture was found to be 1.05. The resulting reaction product was subjected to the polycondensation at 280° C. under a reduced pressure of 0.1 mm. Hg for 2.5 hours. Subsequently the polymer product was isolated. The polymer had a melting point of 251° C. and a reduced viscosity of 0.75 and was excellent in whiteness and transparency.

COMPARATIVE EXAMPLE 1

In the esterification reaction in Example 2 there was added 155 parts of ethyleneglycol instead of 180 parts of ethyleneglycol and in the same manner as in Example 2 the esterification reaction was held and the mole ratio of —COOCH$_2$CH$_2$OH to —COOH in the resulting reaction system was found to be 0.98. The resulting reaction product was subjected to the polycondensation in the same manner as in Example 2 to give a polymer having a reduced viscosity of only 0.41.

On the other hand in the same manner as above-described the esterification reaction was held to give the mole ratio of —COOCH$_2$CH$_2$OH to —COOH being 6.5. The resulting reaction product was subjected to the polycondensation at 280° C. under a reduced pressure of 0.1 mm. Hg for 3 hours to give a polymer having a reduced viscosity of only 0.43.

EXAMPLE 3

In an autoclave there were placed 302 parts of BCE and 155 parts of ethyleneglycol and the esterification was held at 240° C. for 5 hours in the closed system. Then, the produced water and unreacted ethyleneglycol were distilled off and the resulting reaction mixture was heated at 280° C. for 30 minutes to give a homogeneous transparent reaction mixture and the mole ratio of —COOCH$_2$CH$_2$OH to —COOH was found to be 1.04. After the addition of 4.07 parts of p-carboxy-1,2-diphenoxyethane ethyleneglycol ester to the reaction product, the resulting mixture was subjected to the polycondensation at 285° C. for 2.5 hours under a reduced pressure of 5 mm. Hg in a nitrogen stream. The polymer product was isolated and the polymer had a melting point of 250° C. and a reduced viscosity of 0.87 and was excellent in whiteness and transparency.

EXAMPLE 4

The esterification reaction in Example 1 was interrupted in 1.5 hours to give a faint opaque reaction product. The mole ratio of —COOCH$_2$CH$_2$OH to —COOH was found to be 1.07. The resulting product was transferred to a polymerization flask and the temperature was raised to 285° C. over 30 minutes to give an almost transparent homogenous reaction system. Then, the resulting reaction product was subjected to the polycondensation at 285° C. under a reduced pressure of 0.2 mm. Hg for 3 hours to give a polymer excellent in whiteness having a melting point of 250° C. and a reduced viscosity of 0.79.

EXAMPLE 5

In an autoclave there were placed 303 parts of BCE, 7.3 parts of adipic acid and 300 parts of ethyleneglycol, and the esterification was held at 240° C. for 2 hours in the closed system. Then the produced ester and unreacted ethyleneglycol were distilled off, and the mole ratio of —COOCH$_2$CH$_2$OH to —COOH was found to be 1.06. To the obtained reaction mixture there was added the determined amount of p-carboxy-1,2 - diphenoxyethane and the resulting mixture was heated at 285° C. and the polycondensation was held at 285° C. under a reduced pressure of 0.2 mm. Hg for 5 hours. Then, the polymer was isolated. The effect of the amount of molecular weight modifier on the reduced viscosity of the polymer thus obtained is shown in Table IV.

Table IV

| Amount of molecular weight modifier mole percent: | Reduced viscosity |
|---|---|
| 0 | Gelled |
| 2 | 0.931 |
| 3 | 0.705 |
| 5 | 0.579 |

What is claimed is:

1. In a process of producing a linear polyester containing at least 90 mole percent of a recurring unit of the formula:

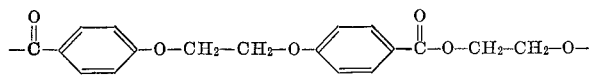

and made by the addition of ethyleneglycol to 1,2-bis (p-carboxyphenoxy) ethane at a reaction temperature in the range of 190° to 280° C. and a reaction pressure in the range of 1 to 80 kg./cm.$^2$, and subsequently polycondensing an intermediate reaction product thus obtained at an elevated temperature under reduced pressure; the improvement comprising:

(1) maintaining during the addition reaction a mole ratio of ethyleneglycol to 1,2-bis (p-carboxyphenoxy) ethane in the range of 1.2 to 5.0 and carrying out said addition reaction for a time less than 10 hours, to secure said intermediate reaction product having a mole ratio of —COOCH$_2$CH$_2$OH to —COOH in the range of 1.0 to 5.0, and (2) effecting the polycondensing reaction in the absence of any catalyst therefor and for a time less than 10 hours.

2. The process of claim 1 wherein at least one compound having the formula:

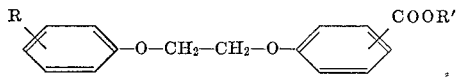

and

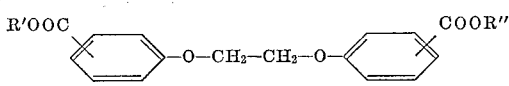

is present during said polycondensation reaction as a molecular weight modifier, wherein:

R is selected from the group consisting of a hydrogen atom, an alkyl group or an alkoxy group;

R' is selected from the group consisting of a hydrogen atom and a —CH$_2$—CH$_2$—OH group; and R" is an alkyl group 3. The process of claim 1 wherein an aliphatic dicarboxylic acid is added during said addition reaction in an amount at most of 10 mole percent, said aliphatic dicarboxylic acid having the formula:

wherein:

$n$ is a whole integer having a value in the range of 1 to 8; and

—(CH$_2$)$_n$— is inclusive of branched hydrocarbon chains having at most 3 carbon atoms in the side chain.

4. The process of claim 1 wherein after said addition reaction is carried out, said intermediate reaction product is further reacted at a temperature in the range of 250° to 300° C. and a pressure in the range of 0.1 mm. Hg to 80 kg./cm.$^2$.

References Cited

UNITED STATES PATENTS

| 2,503,251 | 4/1950 | Edwards et al. | 260—47C |
| 2,828,290 | 3/1958 | Caldwell | 260—76 |
| 2,980,649 | 4/1961 | Caldwell et al. | 260—47 |
| 3,337,500 | 8/1967 | Schnegg et al. | 260—47 |

WILLIAM H. SHORT, Primary Examiner

L. M. PHYNES, Assistant Examiner

U.S. Cl. X.R.

260—75